United States Patent [19]

Miyawaki et al.

[11] Patent Number: 5,644,370

[45] Date of Patent: Jul. 1, 1997

[54] LIQUID CRYSTAL DISPLAY APPARATUS WITH A PLURAL LAYER CONNECTION BETWEEN THE TFT DRAINS AND THE PIXEL ELECTRODES

[75] Inventors: Mamoru Miyawaki, Tokyo; Shigetoshi Sugawa, Atsugi, both of Japan

[73] Assignee: Canon Kabushiki Kaisha, Tokyo, Japan

[21] Appl. No.: 675,807

[22] Filed: Jul. 5, 1996

Related U.S. Application Data

[63] Continuation of Ser. No. 330,611, Oct. 28, 1994, abandoned, which is a continuation of Ser. No. 10,628, Jan. 28, 1993, abandoned.

[30] Foreign Application Priority Data

Jan. 31, 1992 [JP] Japan .................... 4-040491
Jan. 31, 1992 [JP] Japan .................... 4-040495

[51] Int. Cl.⁶ .................................................. G02F 1/136
[52] U.S. Cl. ................................................. 349/43; 349/47
[58] Field of Search .................................... 359/79, 59

[56] References Cited

U.S. PATENT DOCUMENTS

| | | | |
|---|---|---|---|
| 4,024,626 | 5/1977 | Leupp et al. | 29/571 |
| 5,003,356 | 3/1991 | Wakai et al. | 359/59 |
| 5,130,829 | 7/1992 | Shannon | 359/59 |
| 5,189,500 | 2/1993 | Kusunoki | 359/72 |
| 5,200,847 | 4/1993 | Mawatari et al. | 359/59 |
| 5,206,749 | 4/1993 | Zavracky et al. | 359/59 |
| 5,208,690 | 5/1993 | Hayashi et al. | 359/59 |
| 5,327,001 | 7/1994 | Wakai et al. | 359/59 |
| 5,365,079 | 11/1994 | Kodaira et al. | 359/59 |

FOREIGN PATENT DOCUMENTS

| | | |
|---|---|---|
| 0449123 | 10/1991 | European Pat. Off. . |
| 52-124860 | 10/1977 | Japan . |
| 62-297289 | 12/1987 | Japan . |
| 63-101831 | 5/1988 | Japan . |
| 63-313133 | 12/1988 | Japan ............ 359/79 |
| 1-156725 | 6/1989 | Japan ............ 359/79 |
| 3-012637 | 1/1991 | Japan ............ 359/59 |
| 3-211526 | 9/1991 | Japan ............ 359/79 |
| 3-211527 | 9/1991 | Japan ............ 359/79 |

OTHER PUBLICATIONS

Week 4877, Derwent Publications Ltd., London, GB; AN 77-85481.
Week 2488, Derwent Publications Ltd., London, GB; AN 88-164211.
Week 0688, Derwent Publications Ltd., London, GB; AN 88-039207.
J.R. Troxell et al., "Enhanced Polysilicon Thin-Film Transistor Performance by Oxide Encapsulation", Journal of the Electrochemical Society, USA, vol. 138, No. 3, pp. 802–806 (Mar. 1991).
Patent Abstracts of Japan, vol. 13, No. 098 (P-840), Mar. 8, 1989, Abstract of JP 63-279 228 (OKI Electric), Nov. 16, 1988.
Patent Abstracts of Japan, vol. 12, No. 163 (P-703) (3010), May 18, 1988, Abstract of JP 62-278 537 (Toshiba), Dec. 3, 1987.
Patent Abstracts of Japan, vol. 15, No. 188 (P-1201), May 15, 1991, Abstract of JP 03-042 627 (Matsushita), Feb. 22, 1991.

*Primary Examiner*—Anita Pellman Gross
*Attorney, Agent, or Firm*—Fitzpatrick, Cella, Harper & Scinto

[57] ABSTRACT

A liquid crystal display apparatus has LOCOS insulating layers having an increased thickness under pixel electrodes, the LOCOS insulating layers being formed by LOCOS-oxidizing a Si layer formed on a glass substrate. Because of the thick LOCOS insulating layers, the pixel electrodes are provided at an elevated position which is substantially the same level as the top surfaces of the TFT portions. The apparatus also has metal layers of W, Al or the like which connect the elevated pixel electrodes and the drains. After W, Al or the like is deposited on the top surface of the drains, ITO deposited to form the pixel electrodes so that the electrodes are connected to the deposited metal layers.

10 Claims, 8 Drawing Sheets

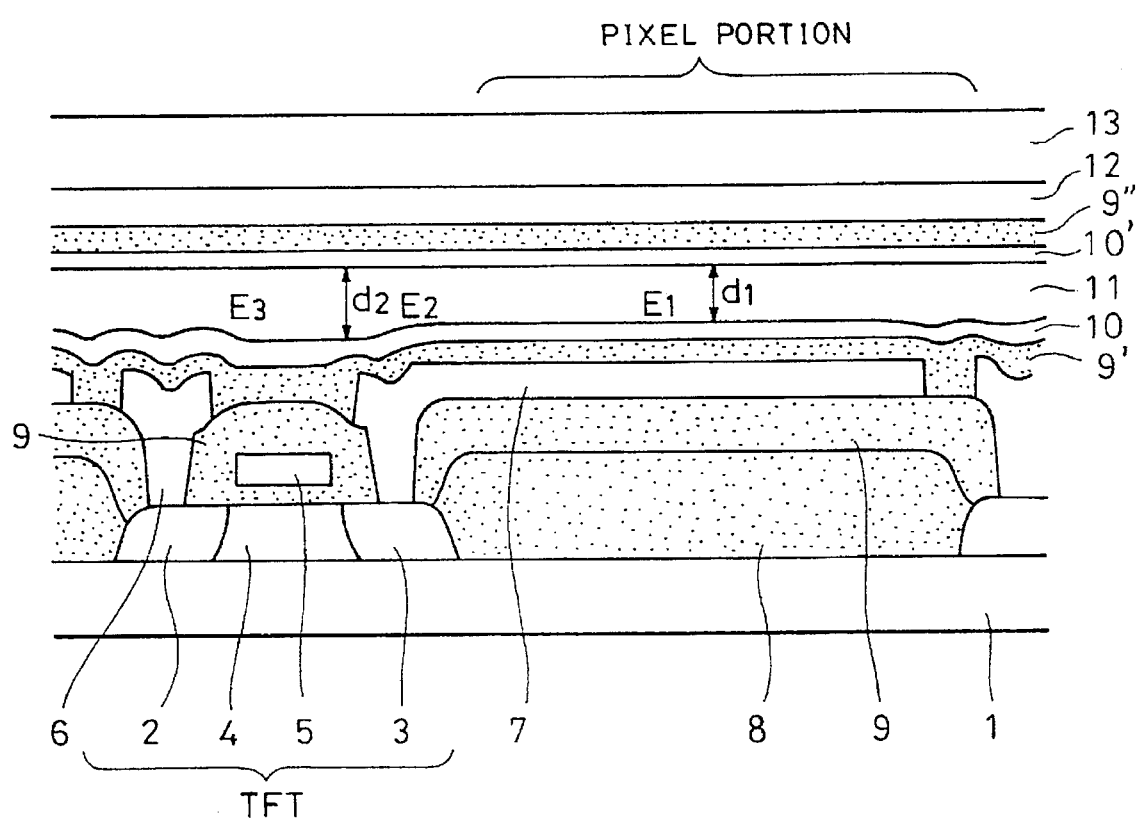

LIQUID CRYSTAL DISPLAY APPARATUS
WITH A PLURAL LAYER CONNECTION
BETWEEN THE TFT DRAINS AND THE
PIXEL ELECTRODES

This application is a continuation, of application Ser. No. 08/330,611 filed Oct. 28, 1994, now abandoned, which is a continuation of application Ser. No. 08/010,628 filed Jan. 28, 1993, abandoned.

BACKGROUND OF THE INVENTION

1. Field of the Invention

The present invention relates to a liquid crystal display apparatus for displaying images or pictorial images.

2. Description of the Related Art

To improve the resolution or display precision of a liquid crystal display apparatus for displaying images or the like, one frame needs to be divided into as many picture elements as possible. In other words, the liquid crystal display apparatus needs to have a display panel comprising a very large number of pixels. To efficiently drive many pixels, the active matrix method is widely employed, in which switching devices provided in the individual pixels are matrix-driven so as to turn the pixel electrodes on and off.

According to the types of switching devices, the active matrix method fall into two main groups: the three-terminal method, and the two-terminal method. Liquid crystal display apparatuses employing three-terminal devices, particularly, liquid crystal display apparatuses employing thin film transistors (referred to as "TFT"s hereinafter) formed by using amorphous silicon or polycrystal silicon, have been studied and developed.

FIG. 11 is a schematic sectional view of a display portion of a conventional liquid crystal display apparatus employing TFTs. The figure shows: a transparent substrate 1 made of, e.g., glass; an active layer 2 to 4 of a TFT (regions 2 to 4 are referred to as a "source", a "drain" and a "channel", respectively); a gate 5 of the TFT; a source line 6 made of ITO (indium tin oxide) or a metal such as Al; a pixel electrode 7 generally made of ITO, the pixel electrode 7 being connected to the drain 3; insulating layers 9, 9' and 9"; alignment control films 10 and 10' for aligning liquid crystal molecules; a liquid crystal 11; a counter electrode 12; and a counter substrate 13. In a normal production method, the two substrates 1 and 13 are formed separately, and the liquid crystal 11 is enclosed in a gap between the substrates while the gap size is being controlled by a spacer (not shown). The molecules of the liquid crystal 11 sandwiched between the substrates 1 and 13 are orientated in accordance with electric field which is controlled by switching of the TFT, thus changing the light transmission characteristic thereof.

However, because the gap size $d_1$ in a pixel portion is substantially greater than the gap $d_2$ size over the TFT as shown in FIG. 11, the electric field $E_1$ in the pixel portion is different from the electric fields $E_2$ and $E_3$ over the TFT ($E_1 < E_2$, $E_3$). Therefore, the electric field E1 in the pixel portion is strongly affected by the neighboring electric fields E2 and E3, thus causing deterioration of the image quality or other adverse effects. Further, the difference between the gap sizes d1 and d2 directly affects orientation of the liquid crystal molecules and, therefore, also causes deterioration of the quality of a displayed image.

Japanese Patent Application Laid-Open No. 62-247330 discloses a method of substantially eliminating the above-described gap size difference by providing an insulating layer between the two pixel electrodes. However, this method cannot be simply applied to a display apparatus employing TFTs. Production of semiconductor active devices, such as TFTs, requires complicated and elaborate processes and, therefore, makes the quality control thereof very difficult.

Further, in a TFT formed as described above, two contact portions where the source region 2 and the drain region 3 are connected to a connecting line of the source line (signal line) 6 and the pixel electrode 7 respectively are surrounded by the insulating layers 9 and 9' and, thus, have the shapes of deep wells. Therefore, it is difficult to achieve good connection in the contact portions. Particularly, good connection between the pixel electrode 7 made of ITO and the drain region 3 is likely to fail, resulting in an increased contact resistance. Because ITO, which is used to achieve the essential condition of pixel electrodes, that is, transparency, has a low film forming temperature of about 150° to 300° C., filling the well-like contact portion with ITO (referred to as "step coverage" hereinafter) often fails and connection to the drain portion 3. Further, because the gap size between the substrates greatly vary over at the contact portions, disturbance of the liquid-crystal orientation characteristic and the display characteristic may well deteriorate. If ITO is also used to form the source lines 6, the same types of problem will occur, thus reducing the yield.

SUMMARY OF THE INVENTION

Accordingly, the present invention is intended to solve the problems of the conventional art, which problems are caused by the gap size difference as described above.

An object of the present invention is to provide a liquid display apparatus which achieves an improved reliability by unfailingly obtaining good connections of the source and drain regions of the transistors to their neighboring line and electrodes, particularly, good connections between the drain regions and the pixel electrodes, and which also achieves an improved liquid-crystal orientation characteristic by substantially leveling the top portion of the TFTs and the surrounding portions thereof.

An aspect of the present invention provides an active-matrix type liquid crystal display apparatus comprising: a thin film transistor for acting as a switching device; a pixel having an electrode which is connected to a main electrode of the thin film transistor; and an insulating layer formed under the electrode of the pixel, the insulating layer being thicker than an active layer of the thin film transistor.

Another aspect of the present invention provides an active-matrix type liquid crystal display apparatus comprising: a thin film transistor for acting as a switching device; a pixel having an electrode which is connected to the thin film transistor; and a metal layer provided at least in a connecting portion which connects the thin film transistor and the electrode of the pixel.

Further objects, features and advantages of the present invention will become apparent from the following description of the preferred embodiments with reference to the attached drawings.

BRIEF DESCRIPTION OF THE DRAWINGS

FIG. 1 is a sectional view of an essential portion of an embodiment of the present invention.

DESCRIPTION OF THE PREFERRED EMBODIMENTS

An active-matrix type liquid crystal display apparatus according to the first aspect of the present invention comprises: a thin film transistor for acting as a switching device; a pixel having an electrode connected to the main electrode of the thin film transistor; and an insulating layer formed under the electrode of the pixel, the insulating layer being thicker than an active layer of the thin film transistor.

A LOCOS (local oxidation of silicon) layer should be preferably provided to control the thickness of the insulating layer.

Figure 2A:
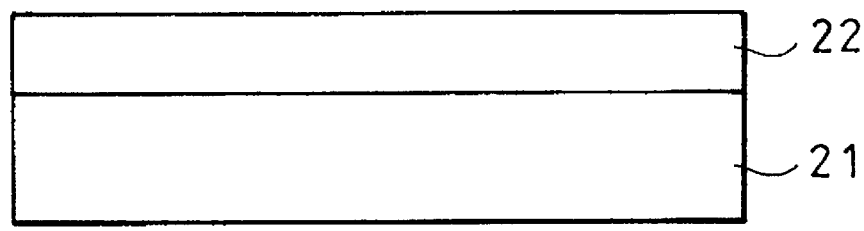
FIGS. 2(a) to 2(c) illustrate the process of LOCOS (local oxidation of silicon) according to the present invention.
Figure 2B:
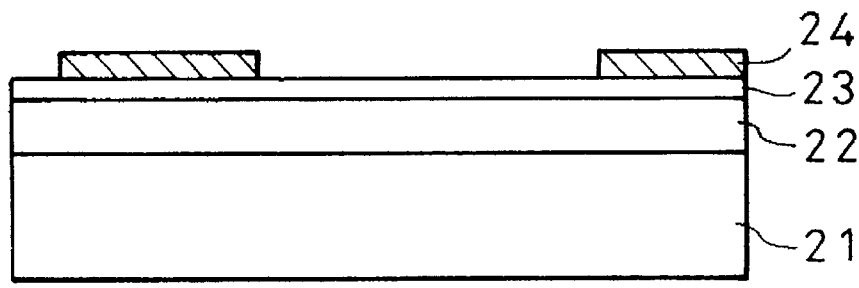
Figure 2C:
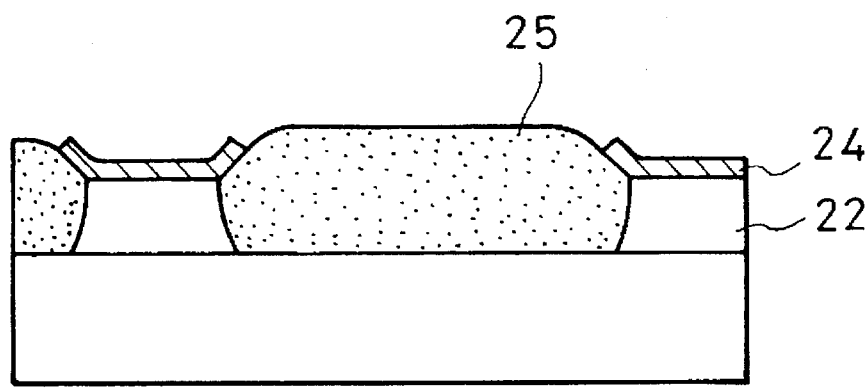

FIGS. 2(a) to 2(c) illustrate a method of forming a LOCOS layer. In the first step, polycrystal silicon 22 is deposited on a quartz substrate 21 by CVD (chemical vapor deposition), as shown in FIG. 2(a). Use of the quartz substrate is preferable because quarts substrate is suitable for the wet oxidation performed at high temperatures of 1,000° to 1,000° C. which is performed at a later step. Next, an oxide thin film 23 is provided on the polycrystal Si 22, on which film SiN patches 24 are formed by patterning, as shown in FIG. 2(b). Finally, selective oxidation is performed, thus forming a LOCOS layer 25 which has a thickness increased by the oxidation, as shown in FIG. 2(c).

According to the present invention, the active layers of the TFTs are formed by using, preferably, polycrystal Si, amorphous Si or monocrystal Si. Such silicons can be suitably produced or formed on a substrate by any method that is currently employed for that purpose. Monocrystal Si is particularly preferable because a monocrystal thin film epitaxially grown on a porous Si substrate has practically no defects and the production cost thereof is relatively low.

The porous Si substrate has pores having an average diameter of about 600 Å according to transmission electron microscopic observation. The porous Si substrate retains a monocrystal property while the density thereof is reduced to about half the density of monocrystal Si. Therefore, the porous Si substrate facilitates both epitaxial growing of a monocrystal Si layer and accelerated etching. However, if the porous Si substrate is subject to a temperature of 1,000° C. or higher, the favorable accelerated etching characteristic deteriorates because the inner pores are rearranged at such temperatures. Therefore, the epitaxial growth of a Si layer is suitably performed by a low-temperature method such as molecular beam epitaxy, plasma CVD, thermal CVD, optical CVD, bias sputtering or the liquid crystal growth method.

A method in which a p-type Si is made porous and a monocrystal layer is epitaxially grown thereon will be described.

First, a monocrystal Si substrate is made porous by anodization using HF solution. The density is substantially reduced from 2.33 g/cm³ of monocrystal Si by the anodization. Any desired destiny of the porous Si substrate within a range between 0.6 and 1.1 g/cm³ can be obtained by suitably determining a HF concentration in the solution within a range between 20 and 50 wt. %. The porous layer can be easily formed on a p-type Si substrate because of the below-described reason.

The porous Si was found as a by-product while a study was being conducted to develop the electrolytic polishing technique. When Si dissolves into HF solution during anodization, positive holes are required for the following anodic reaction of Si:

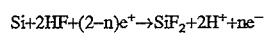

or

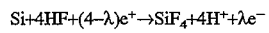

where $e^+$ and $e^-$ are a positive hole and an electron, respectively; and n and λ are the numbers of positive holes necessary for one atom of Si to dissolve, a condition n>2 or λ>4 needing to be satisfied in order to form porous Si.

Thus, p-type Si having positive holes can be easily made porous.

Further, it was reported that high-concentration n-type Si can also be made porous. Thus, both p-type Si and n-type Si can be made porous.

Since a great deal of void is formed inside the silicon substrate during anodization, the density of the porous layer is reduced to less than half the density of the non-porous layer, and the surface area of the porous layer is increased at a rate greater than the increasing rate of the volume thereof. Therefore, the porous layer is chemically etched at a much greater rate than the non-porous monocrystal layer.

Monocrystal Si is made porous by anodization under the following conditions:
applied voltage, 2.6 V;
current density, 30 mA·cm⁻²;
anodization solution, HF:H₂O:C₂H₅OH=1:1:1;
anodization time, 2.4 hours;
thickness of porous Si, 300 μm; and
porosity, 56%.

Silicon is epitaxially grown on the porous Si substrate formed under the above conditions, thus forming a monocrystal Si thin film. The thickness of the monocrystal Si thin film should preferably be 50 μm or less, more preferably, 20 μm or less.

After the surface of the monocrystal Si thin film is oxidized, the oxide layer on the surface of the monocrystal Si thin film is stuck to a substrate which will serve as the substrate of the liquid crystal display apparatus. Alternatively, another monocrystal Si substrate is separately prepared, and the surface thereof is oxidized. Then, the oxidized surface (the oxide film surface) of the monocrystal Si substrate is stuck to the surface of the monocrystal Si thin film which has been formed on the porous Si substrate. In either of these cases, an oxide film is provided in the interface between the monocrystal Si thin layer and the other substrate. The oxide film therebetween is advantageous because, for example, if the other substrate is glass, the interfacial state between the Si active layer and the oxide film is lower than the interfacial state which would be created between the Si active layer and the glass itself, thus significantly improving the electronic device characteristics. A still another method may be employed in which the porous Si substrate is removed by selective etching and, then, the monocrystal Si thin film is stuck to another substrate. The surfaces of the monocrystal Si thin film and the other substrate are washed, and then they are put in contact with each other. In this manner, Van der Waals attraction couples the two substrates so fast that they cannot be easily pulled off. To complete coupling therebetween, the coupled substrates are heated in an atmosphere of nitrogen at a temperature in a range between 200° and 900° C., preferably in a range between 600° and 900° C.

Then, a layer of $Si_3N_4$ is deposited as an etching protection film on the entire surface of the coupled substrates, followed by removing the $Si_3N_4$ layer only from the surface of the porous Si substrate. Instead of the $Si_3N_4$ layer, Apiezon wax may be used. Finally, the entire porous Si substrate is removed by, e.g., etching, thus obtaining a semiconductor substrate having a layer of thin film monocrystal Si.

A selective etching method in which the porous Si substrate is removed by electroless wet etching will be described.

Selective etching of the porous Si can be suitably performed without etching crystal Si by using any of the following HF containing solutions: hydrofluoric acid; buffered hydrofluoric acid containing ammonium fluoride ($NH_4F$), hydrogen fluoride (HF) or the like; hydrofluoric acid containing hydrogen peroxide, or a mixture thereof with buffered hydrofluoric acid; hydrofluoric acid containing alcohol, or a mixture thereof with buffered hydrofluoric acid; or hydrofluoric acid containing hydrogen peroxide and alcohol, or a mixture thereof with buffered hydrofluoric acid. The coupled substrates are dipped in any of the above listed solutions in order to perform etching. The etching rate varies depending on the temperature of the solution and the concentrations of hydrogen fluoride, buffering substances and hydrogen peroxide in the etching solution. The addition of hydrogen peroxide solution to the etching solution accelerates the oxidation of Si, thus increasing the reaction rate. Further, by varying the concentration of hydrogen peroxide in the etching solution, the reaction rate can be controlled. Still further, if alcohol is added to the solution, the gas foams produced by the reaction will be immediately removed from the etching surface without stirring the solution, thus facilitating uniform and efficient etching of the porous Si.

The concentration of HF originating from the buffered hydrofluoric acid in the etching solution should preferably be in a range between 1 an 95 wt. %, more preferably between 1 and 85 wt. %, and still more preferably between 1 and 70 wt. %. The concentration of $NH_4F$ originating from the buffered hydrofluoric acid in the etching solution should preferably be in a range between 1 and 95 wt. %, more preferably between 5 and 90 wt. %, and still more preferably between 5 and 80 wt. %.

The HF concentration in the etching solution should preferably be in a range between 1 and 95 wt. %, more preferably between 5 and 90 wt. %, and still more preferably between 5 and 80 wt. %.

The $H_2O_2$ concentration in the etching solution should preferably be in a range between 1 and 95 wt. %, more preferably between 5 and 90 wt. %, and still more preferably between 10 and 80 wt. %. Further, the $H_2O_2$ concentration should be determined so as to achieve the desirable effect of $H_2O_2$ described above.

The alcohol concentration in the etching solution should preferably be 80 wt. % or lower, more preferably 60 wt. % or lower, and still more preferably 40 wt. % or lower. Further, the alcohol concentration should be determined so as to achieve the desirable effect of alcohol described above.

The etching temperature should be preferably in a range between 0° and 100° C., preferably between 5° and 80° C., and still more preferably between 5° and 60° C.

Any alcohol can be suitably used in the etching solution as long as it achieves the desirable effect of alcohol described above and it has practically no adverse effect on the processes of producing the liquid crystal display apparatus of the invention. Examples of such alcohol are ethyl alcohol and isopropyl alcohol.

The above-described method of producing a semiconductor substrate is described in, e.g., European Patent Application Laid-Open No. 469630.

The semiconductor substrate obtained as described above has a monocrystal Si layer which is comparable with an ordinary Si wafer. The monocrystal Si layer is uniformly and flatly formed as a thin film over the entire surface of the substrate.

According to the present invention, the peripheral driving circuits can be formed on the Si substrate in the same manner as in a conventional liquid crystal display apparatus. Further, the display portion can be made transparent.

If a pixel electrode made of ITO fails to achieve good contact with the drain because the thickness of the insulating layer under the pixel electrode is increased, metal layers may be formed on the drains to facilitate good connection of ITO to the drains.

If the present invention is applied to a color image display apparatus, the light-blocking layer can be provided on the TFT substrate side instead of providing it on the counter electrode side as in the conventional art, thus improving the light-blocking effect thereof.

According to the present invention, the gap between the substrates in the pixel portions is reduced to substantially the same size as the gap therebetween the substrates over the TFT portions by increasing the thickness of the insulating layers under the pixel electrodes. However, even if the insulating layers becomes so thick that the gap in the pixel portions will become smaller than the gap in the TFT portions, the gap size in the pixel portion can be adjusted by reducing the thickness of an insulting layer provided over the pixel electrode.

[Embodiment 1]

Figure 11:
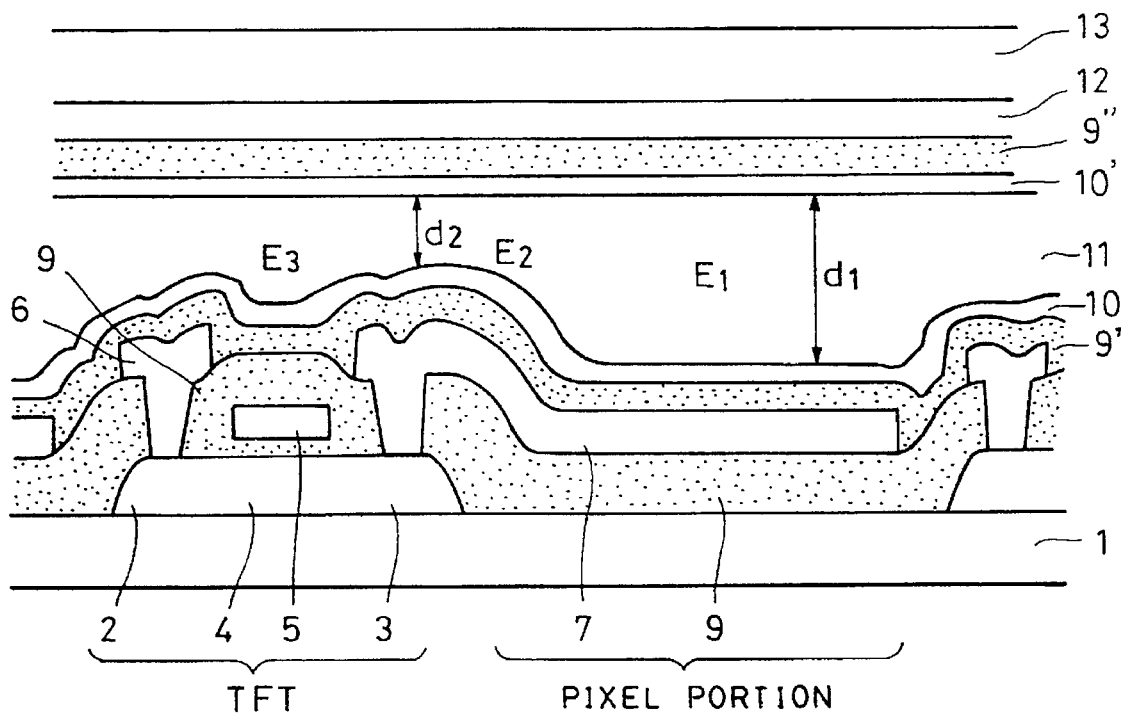
FIG. 11 is a sectional view of an essential portion of a conventional liquid crystal display apparatus.

FIG. 1 illustrates Embodiment 1 according to the liquid crystal display apparatus of the present invention. In the figure, the same numerals as those in FIG. 11 showing the conventional art are used to denote the equivalent portions. This embodiment has a LOCOS layer 8 in an insulating layer which also includes a insulating film 9. Because of the LOCOS layer 8, the thickness of the insulating layer under a pixel electrode 7 is increased, compared with that in the conventional art. As a result, an insulating film 9' extending over the pixel electrode 7 and a TFT portion is made substantially flat. In other words, the gap sizes d1 and d2 are substantially equal. Therefore, the electric field applied to a liquid crystal 11 is substantially uniform.

$E_1 = E_2 = E_3$

Thus, good display characteristics are obtained.

The LOCOS layer 8 is formed as shown in FIGS. 2(a) to 2(c). After a polycrystal Si layer 22 is formed on a transparent substrate 21 made of, e.g., glass, an oxide layer 23 is formed on the surface of the polycrystal Si layer 22. Then, instead of immediately proceeding to formation of TFT by local patterning as is done in an ordinary method, the portions which will be used to form TFTs are masked with SiN patches 24, and oxidation is perfumed (local oxidation of silicon). Thick oxide layers (LOCOS layers) 25 are thus formed as shown in FIG. 2(c).

[Embodiment 2]

Figure 3:
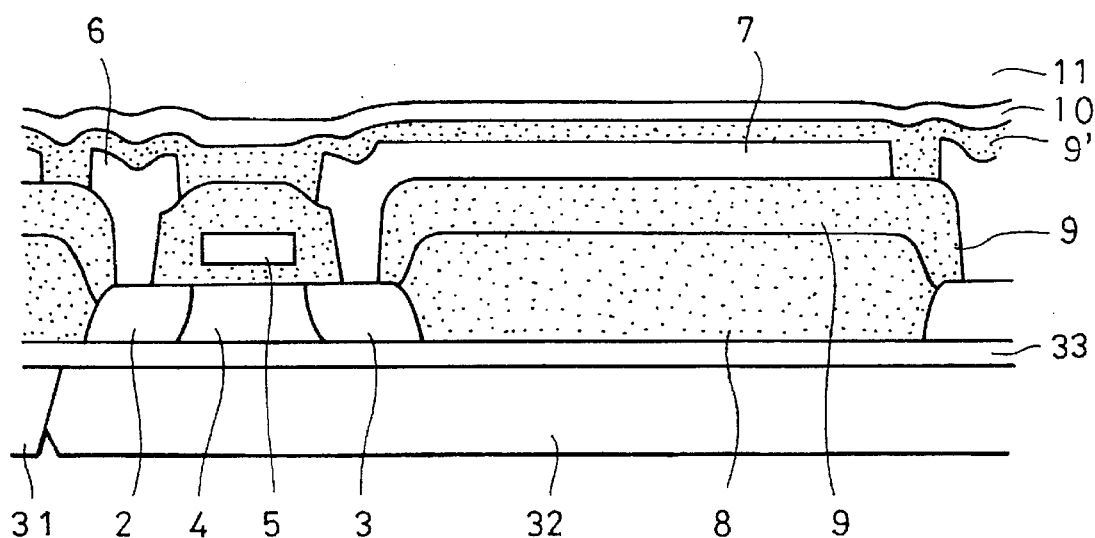
FIG. 3 is a sectional view of an essential portion of another embodiment of the present invention.

FIG. 3 illustrates Embodiment 2 of the present invention. This embodiment is formed as described below. First, monocrystal Si is formed by using porous Si, as described above. After oxidizing the surface of the monocrystal Si to form a $SiO_2$ film 33, a Si substrate 31 is stuck to the surface of the $SiO_2$ film 33. Then, after necessary members are formed on the substrate, a portion of Si substrate 31 is removed from the display portion by etching. The SiO2 film 33 serves as an etching stopper. The void formed by etching filled with a potting material 32 in order to reinforce the substrate.

Because this embodiment employs monocrystal Si having no defects, it increases the TFT driving speed ($\mu=10\rightarrow 500$ cm/V·sec) and reduces the TFT leak current ($10^{-10}\rightarrow$a range between $10^{-12}$ and $10^{-13}$ A).

[Embodiment 3]

Figure 4:
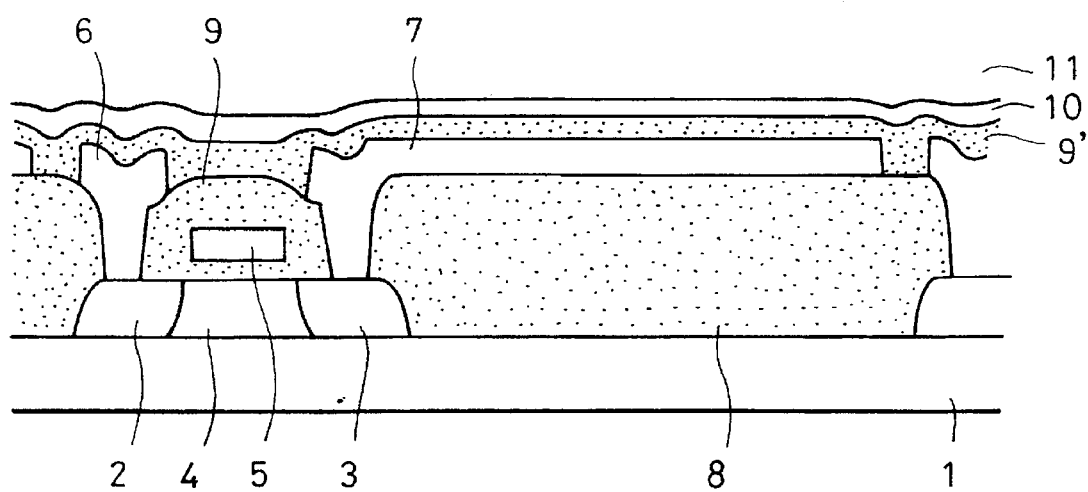
FIG. 4 is a sectional view of an essential portion of still another embodiment of the present invention.

FIG. 4 illustrates Embodiment 3 of the present invention. In this embodiment, the insulating layer under a pixel electrode 7 is composed of only one layer instead of two layers (the LOCOS layer 8 and the insulating film 9 in Embodiments 1 and 2). First, a Si layer is formed on a substrate 1 so as to become thicker than the active layers 2, 3 and 4 of the TFTs which will be formed later. Then, only the TFT portions of the Si layer are etched to obtain a thickness necessary to form TFTs, and the unetched portions of the Si layer, which are therefore thick, are oxidized (LOCOS), thus forming a LOCOS layer 8. Naturally, the thus-formed LOCOS layer 8 is thicker than the LOCOS layers 8 in Embodiments 1 and 2. Because the LOCOS layer 8 in this embodiment is substantially thick, the size of the gap between the substrates can be made substantially consistent without providing an extra insulating layer under the pixel electrode 7.

[Embodiment 4]

In this embodiment, the insulating layer under the pixel electrode is formed by patterning instead of LOCOS (local oxidation of silicon) as in Embodiments 1 to 3. Embodiment 4 does not have any disadvantages in its structure or performance, compared with Embodiment 1 to 3.

[Embodiment 5]

Figure 5:
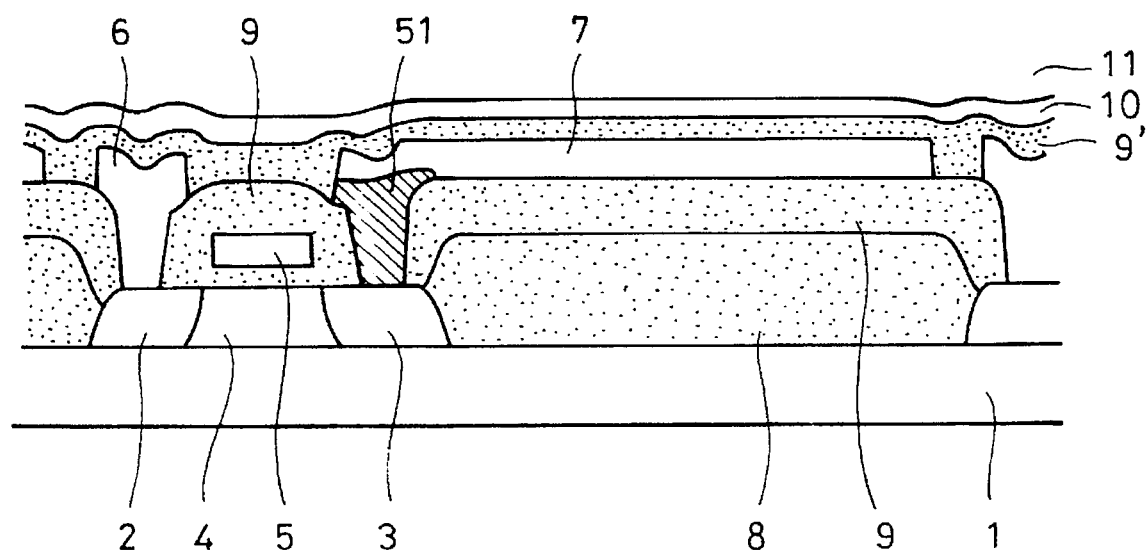
FIG. 5 is a sectional view of an essential portion of a further embodiment of the present invention.

FIG. 5 illustrates Embodiment 5 of the present invention. As shown in the figure, a portion where a pixel electrode 7 is connected to a drain 3, in other words, a portion which is surrounded by an insulating layer 9 around a gate 5 and insulating layers 8 and 9 provided under the pixel electrode 7, is deeper than the comparable portion in a conventional liquid crystal display apparatus, because the thickness of the insulating layers 8 and 9 is increased according to the present invention. Therefore, when ITO is vapor-deposited to form the pixel electrode 7, ITO might fail to reach the drain 3 through the deep well-like portion described above, resulting in a poor or no connection between the drain 3 and the formed pixel electrode 7. However, in this embodiment, a metal layer 51 is provided between the drain 3 and the pixel electrode 7 so as to make a good connection therebetween. The metal layer 51 should preferably be made of a metal, e.g., W or Al, which will reach the drain 3 and fill the deep well-like portion by vapor deposition. By providing the metal layers 51, the reliability of a liquid crystal display apparatus can be significantly increased.

[Embodiment 6]

Figure 6:
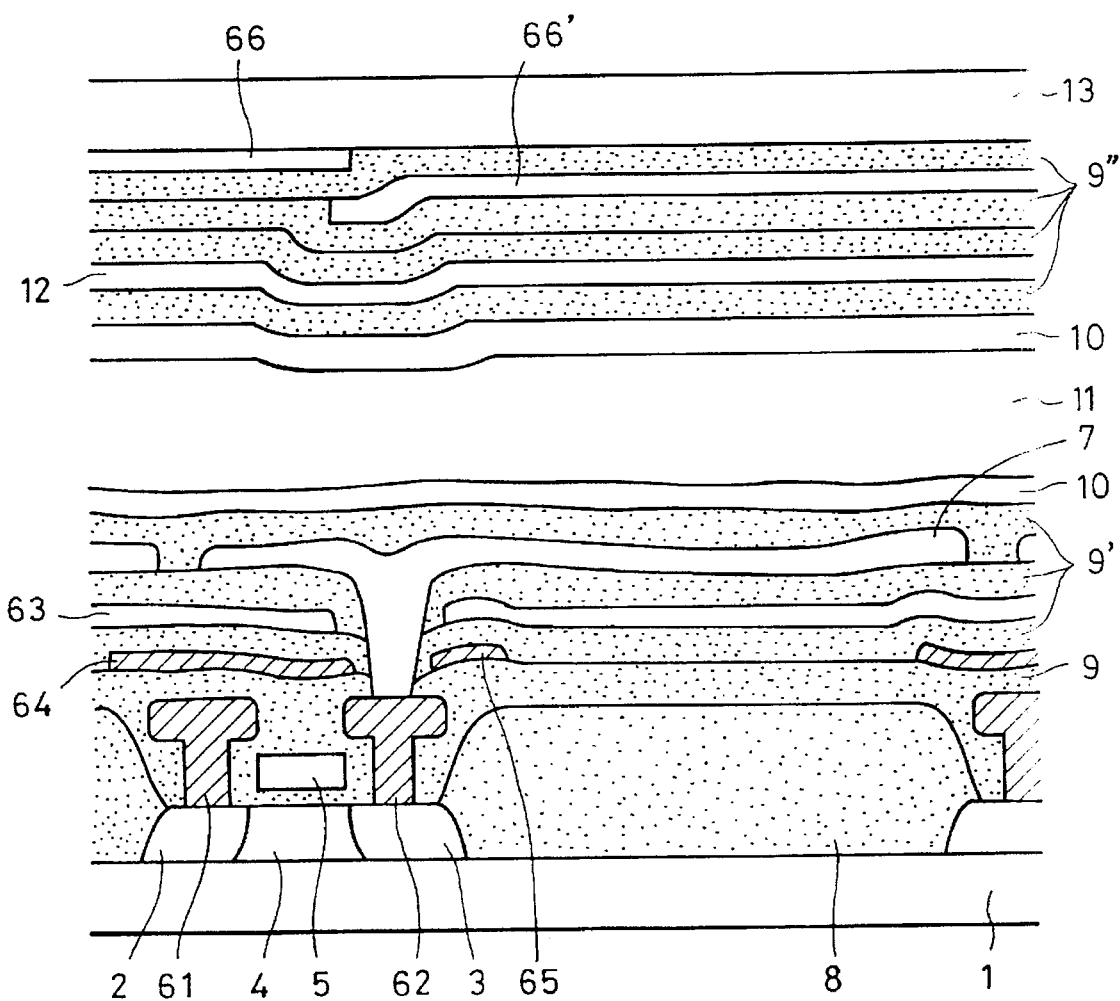
FIG. 6 is a sectional view of an essential portion of a still further embodiment of the present invention.
Figure 7:
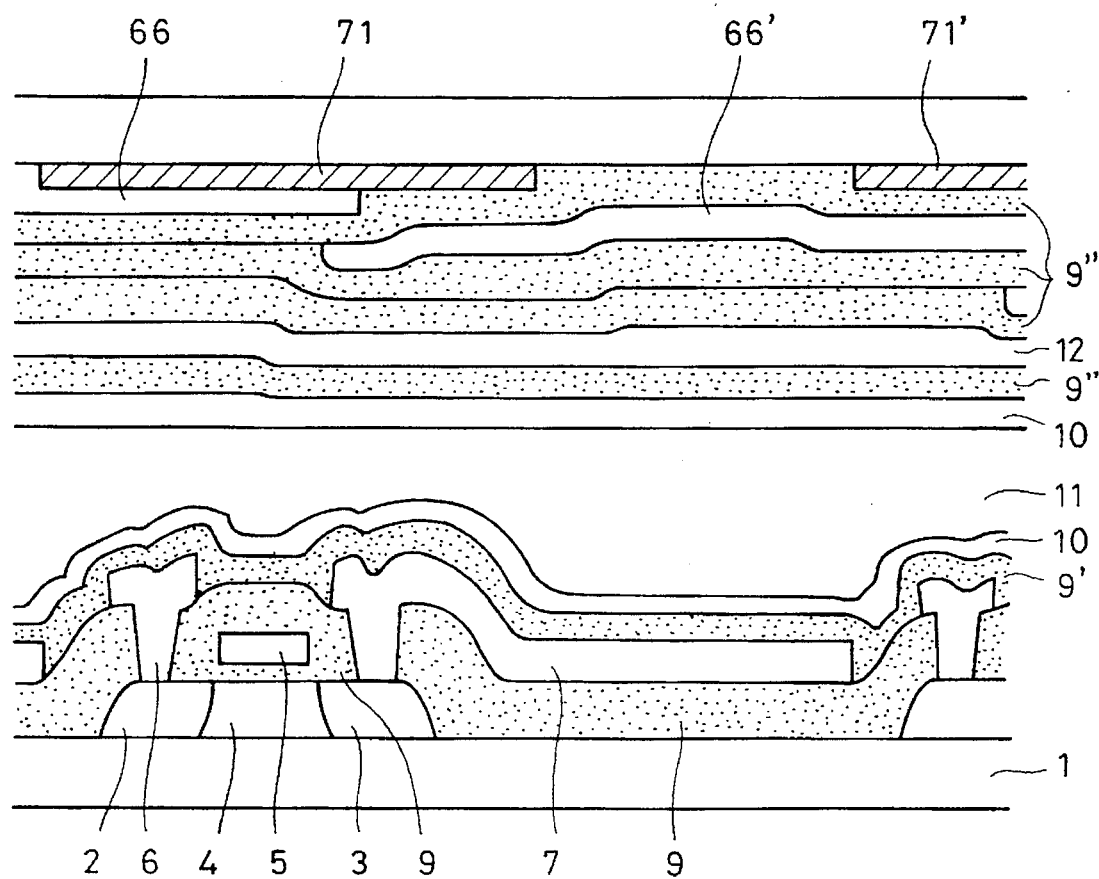
FIG. 7 is a sectional view of an essential portion of a conventional color-image liquid crystal display apparatus.

FIG. 6 illustrates Embodiment 6 of the present invention. This embodiment is a liquid crystal display apparatus for displaying color images. For comparison, a conventional color liquid crystal display apparatus is shown in FIG. 7. Both figures show color filters 66 and 66' and light blocking layers 71 and 71'. In the conventional apparatus, the light blocking layers are provided on the counter electrode, as shown in FIG. 7. In other words, the light blocking layers 71 and 71' are substantially apart from the TFTs, about 6 to 10 μm apart, and this distance is filled with insulating layers, lines, the color filters and liquid crystal. Therefore, the conventional art has a problem in that light refracted while traveling through the many different layers leaks from the TFT portions, thus deteriorating image contrast and tone gradation characteristics. If light blocking layers are provided close to the TFTs to eliminate this problem in the conventional apparatus, the gap size difference further increases. Therefore, to solve this light leaking problem, the light blocking layers are allowed to cover peripheral portions of the pixel as well as the TFT portions, according to the conventional art. In other words, the light leaking problem is mitigated in exchange for a reduction of the numerical aperture. Thus, the conventional art has a problem of relatively dark images.

However, according to the present invention, since the difference between the gap size in the pixel portions and the gap size over the TFT portions is substantially eliminated, the light leaking problem can be solved by providing light blocking layers close to the TFTs without causing any significant problem.

As shown in FIG. 6, the apparatus of Embodiment 4 has first light blocking layers 61, 62 and second light blocking layers 64, 65 which are provided close to a TFT. Actually, the first light blocking layers 61, 62 are lines which are connected to a source 2 and a drain 3 of the TFT, respectively. The lines 61, 62 are formed in such shapes as to cover the source 2 and the drain 3, respectively. The second light blocking layers 64, 65 are provided on insulating layers 9 surrounding the first light blocking layers 61, 62, so as to cover the first light blocking layers 61, 62. Thus, these light blocking layers 61, 62, 64 and 65 substantially shield the TFT from light. The first light blocking layers 61, 62 are made of a metal, such as Al, because they must serve as electric lines connected to the TFTs. The second light blocking layers 64, 65 can be suitably made of a metal such as Al. Because the second light blocking layers 64, 65 do not serve to conduct current, the electric potential thereof is fixed.

Because this embodiment substantially eliminates light leakage and yet achieves a great numerical aperture, it can display high-quality image having very good contrast and gradation characteristic.

A liquid crystal display apparatus according to the second aspect of the present invention has embedded metal layers provided at least in connecting portions where pixel electrodes are connected to the drain regions of the TFTs. Preferably, embedded metal layers should be provided in both the connecting portions where pixel electrodes are connected to the drain regions and the connecting portions where source lines are connected to the source regions of the TFTs. The embedded metal layers help achieve good connections therebetween, improving reliability.

According to the present invention, any metal may be used to form the embedded metal layers as long as it has good electric conductivity and its step coverage during film formation is better than ITO. However, preferable examples of the metal are W and Al. Embedded metal layers may be formed in the connecting portions after the inner surfaces of the connecting portions are covered with films of barrier metal such as TiN. The barrier metal films substantially prevent oxygen from leaking to the transistors (TFTs).

The embedded metal layers are advantageous particularly if the TFTs are formed by using monocrystal Si thin film portions isolated by LOCOS (local oxidation of silicon). During LOCOS, oxidized portions become thick. The insulating layers having thus-increased thicknesses are likely to reduce the widths (diameters) and increase the depth of the well-like connecting portions connecting to the drain regions. If the connecting portions have such dimensions, it is difficult for ITO to unfailingly connect to the drain regions without providing embedded metal layers in the connection portions. The above-mentioned monocrystal Si film may be formed by a method disclosed by EP 469630.

Monocrystal Si thin film portions may also be isolated by, e.g., etching. If the isolated monocrystal Si thin film portions are employed, switching devices can be driven at high speed, thus improving the performance of the liquid crystal display apparatus.

As described above, according to the present invention, a monocrystal Si thin film should preferably be used to form TFTs. However, TFTs may be formed of polycrystal Si deposited on a glass substrate by the CVD method. A metal such as Al or W may be embedded in contact portions connected to the source regions and drains of the TFTs.

[Embodiment 7]

Figure 8:
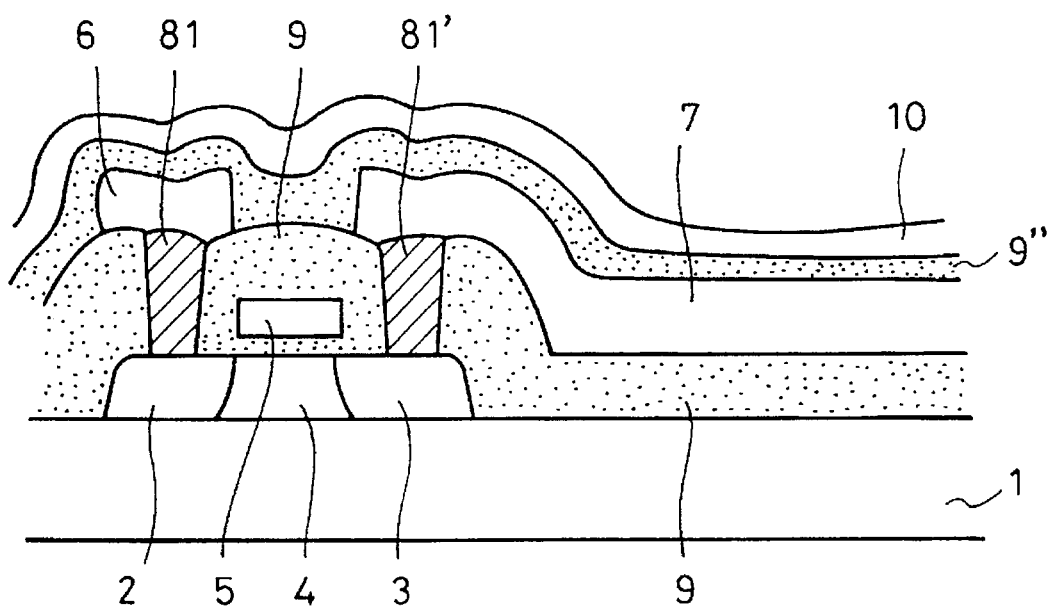
FIG. 8 is a sectional view of a TFT portion according to an embodiment of the present invention.

FIG. 8 illustrates Embodiment 7 of the present invention. Embedded metal layers 81 and 81' made of Al are provided in a connecting portion which connects a source region 2 of a TFT to a source line 6 and a connecting portion which connects a drain 3 to a pixel electrode 7, respectively. These Al layers 81 and 81' is formed by, e.g., Al-CVD under the following conditions:

film forming gas, DMAH (dimethylaluminium hydride, $(CH_3)_2AlH$)

pressure, 1.2 to 3 Torr

DMAH partial pressure, 1.1 to $12.6 \times 10^{-3}$ Torr temperature, 270° to 290° C.

By providing layers of suitable metal, such as Al, in the well-like portions connecting to the TFTs, the source lines 6 and the pixel electrodes 7 made of ITO will unfailingly connect to the TFTs without having to enter the well-like portions. The connecting portions have a depth of about 0.5 to 1 µm and a contact area of about 0.6 to 5 µm². The source lines 6 are formed of a material, such as Al or Al-Si-Ca, by a known method such as sputtering or CVD.

[Embodiment 8]

Figure 9:
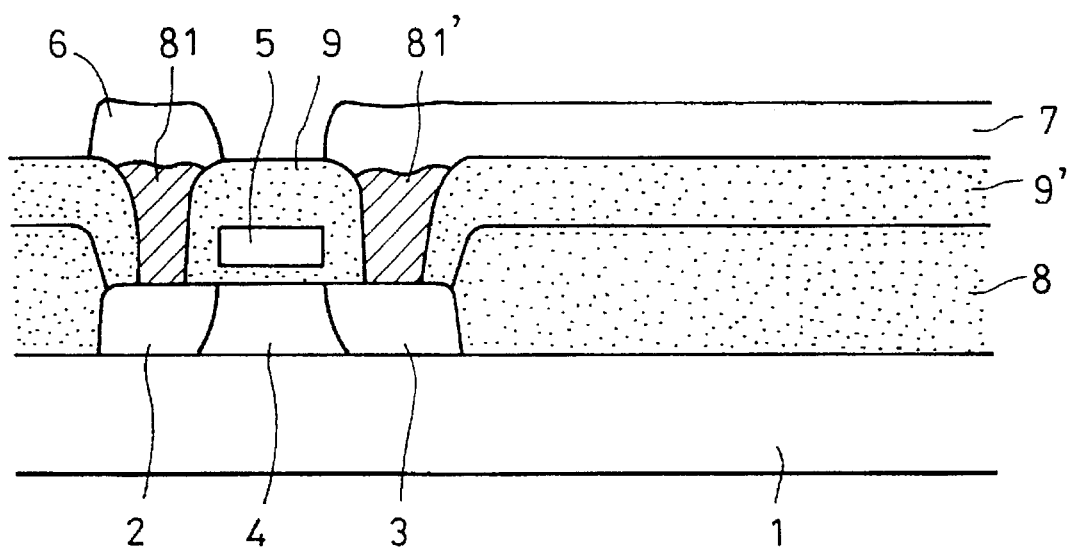
FIG. 9 is a sectional view of a TFT portion according to another embodiment of the present invention.

FIG. 9 illustrates Embodiment 8 of the present invention. In this embodiment, a monocrystal Si thin film as described above is provided on a glass substrate 1 and oxidized by the LOCOS method. $SiO_2$ layers having an increased thickness are thus formed. TFT are formed by using the unoxidized portions of the LOCOS-treated monocrystal Si thin films. Because a $SiO_2$ layer 8 is thicker than the active layer 2 to 4 of a TFT, a pixel electrode 7 is provided at an elevated position which is about as high as a top portion of the TFT portion. Therefore, the liquid-crystal contact surface of the substrate containing TFTs can be made substantially flat, thus improving the liquid-crystal orientation characteristic. However, because the thickness of insulating layers 8 and 9' under the pixel electrode is increased, well-like portions connecting to a drain region 3 and a source region 2 of the TFT may become deep and/or narrow. In this embodiment, the well-like portions are filled with metal layers 81, 81' so that the top surfaces of the metal layers 81, 81' are substantially at the same level as the top surfaces of insulating layers 9 and 9', and then the pixel electrodes and source lines are formed. Therefore, good connections can be unfailingly achieved between the drain regions and the pixel electrodes and between the source regions and the source lines.

[Embodiment 9]

Figure 10:
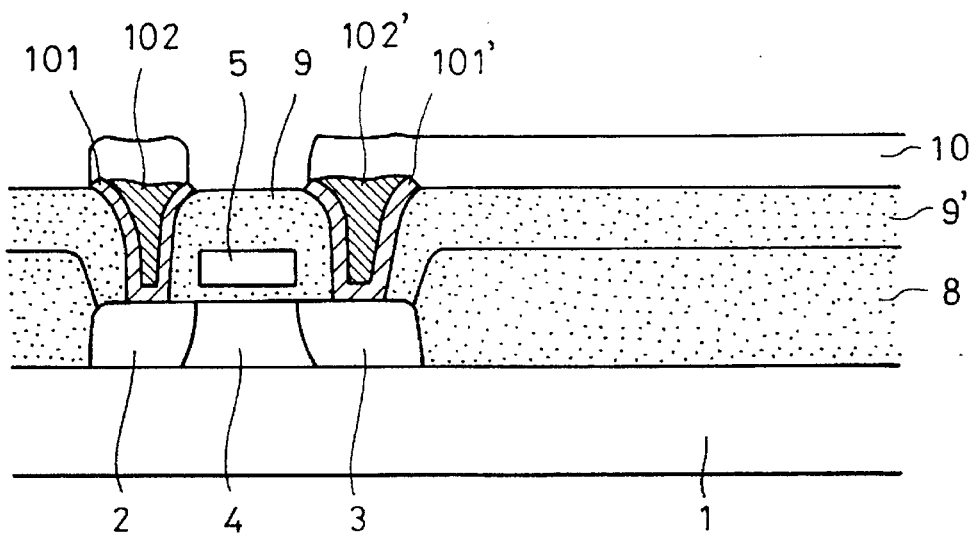
FIG. 10 is a sectional view of a TFT portion according to still another embodiment of the present invention.

FIG. 10 illustrates Embodiment 9 of the present invention. This embodiment has double-layered metal layers in the well-like portions connecting to the TFTs. TiN barrier metal films 101 and 101' having thicknesses of about 1,000 to 2,500 Å are formed on the surfaces of the well-like portions by sputtering. Then, Al is deposited only on the TiN barrier metal films 101 and 101' by the Al-CVD method so as to fill the well-like portions, thus forming metal layers 102 and 102'.

[Embodiment 10]

This embodiment is substantially the same as Embodiment 7, except that W is used instead of Al to form metal layers in the well-like portions. In detail, a $WF_6$-$SiH_4$-$H_2$ system is used to grow W layers only on Si portions. The suitable conditions are as follows:

$SiH_6/WF_6$=0.6 to 0.8 substrate temperature, 300° C.

pressure, 0.1 Torr

[Embodiment 11]

This embodiment is substantially the same as Embodiment 7, except that TiN/Al/TiN triple layers are provided instead of the Al single layers. The TiN/Al/TiN triple layers improve the ohmic characteristic between ITO and monocrystal Si because they improve the ohmic characteristic between ITO and Al as described below. ITO, used as the material of a transparent electrode, contains oxygen. Therefore, when ITO is in direct contact with an Al layer, the contact surface of the Al material is oxidized by oxygen contained in ITO, thus forming an insulating layer, such as $Al_2O_3$, on the contact surface. This insulating layer may well increase the contact resistance. This problem is substantially prevented in this embodiment because it employs the TiN/Al/TiN triple layers, thus achieving a good ohmic characteristic.

As described above, because a liquid crystal display apparatus according to the present invention has pixel electrodes which are provided at substantially the same level as the top portions of the TFT portions, the gap size between the substrate is made substantially consistent, thus achieving an improved liquid-crystal orientation characteristic and uniform electric field. Therefore, the liquid crystal display apparatus of the invention can display high-quality images. Further, because light blocking layers can be provided close to the TFTs in a color liquid crystal display apparatus according to the present invention, large apertures can be obtained. Therefore, the apparatus can display images having high contrast and good gradations.

Further, according to the present invention, because metal layers are provided at least in connecting portions between the TFTs and the pixel electrode, good connections therebetween can be unfailingly achieved. Therefore, the yield and reliability can be improved.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A liquid crystal display apparatus of an active matrix type, comprising:

a thin film transistor acting as a switching device;

a pixel having an electrode which is connected to said thin film transistor;

metal layers provided at least in a connecting portion which connects said thin film transistor and the electrode of said pixel; and insulating layers around said metal layers, wherein a top surface of said metal layers is at substantially a same level as a top surface of said insulating layers around said metal layers.

2. A liquid crystal display apparatus according to claim 1, wherein an active layer of said thin film transistor is isolated by LOCOS-oxidizing a monocrystal Si thin film.

3. A liquid crystal display apparatus according to claim 1, wherein said metal layers are formed of W or Al.

4. A liquid crystal display apparatus according to claim 1, wherein said metal layers are composed of a barrier metal layer and an Al layer.

5. A liquid crystal display apparatus according to claim 1, wherein said metal layers are formed by Al-CVD.

6. A liquid crystal display apparatus of an active matrix type, comprising:

a semiconductor active device acting as a switching device;

a pixel having an electrode which is connected to said semiconductor active device;

metal layers provided at least in a connecting portion which connects said semiconductor active device and the electrode of said pixel; and insulating layers around said metal layers, wherein a top surface of said metal layers is at substantially a same level as a top surface of said insulating layers around said metal layers.

7. A liquid crystal display apparatus according to claim 6, wherein an active layer of said semiconductor active device is isolated by LOCOS-oxodizing a monocrystal Si thin film.

8. A liquid crystal display apparatus according to claim 6, wherein said metal layers are formed of W or Al.

9. A liquid crystal display apparatus according to claim 6, wherein said metal layers are composed of a barrier metal layer and an Al layer.

10. A liquid crystal display apparatus according to claim 6, wherein said metal layers are formed by Al-CVD.

* * * * *

UNITED STATES PATENT AND TRADEMARK OFFICE
CERTIFICATE OF CORRECTION

PATENT NO. : 5,644,370

DATED : July 1, 1997

INVENTOR(S): MIYAWAKI ET AL.

It is certified that error appears in the above-identified patent and that said Letters Patent is hereby corrected as shown below:

COLUMN 1

Line 27, "method" should read --methods--.

COLUMN 3

Line 33, "quarts" should read --quartz--.

COLUMN 5

Line 54, "an" should read --and--.

COLUMN 6

Line 48, "insulting" should read --insulating--.
Line 57, "a" should read --an--.

UNITED STATES PATENT AND TRADEMARK OFFICE
CERTIFICATE OF CORRECTION

PATENT NO. : 5,644,370

DATED : July 1, 1997

INVENTOR(S) : MIYAWAKI ET AL.

It is certified that error appears in the above-identified patent and that said Letters Patent is hereby corrected as shown below:

COLUMN 9

Line 52, "Tort" should read --Torr--.

Signed and Sealed this

Third Day of March, 1998

Attest:

BRUCE LEHMAN

*Attesting Officer*  Commissioner of Patents and Trademarks